United States Patent [19]

Reese et al.

[11] Patent Number: 5,440,598
[45] Date of Patent: Aug. 8, 1995

[54] FUEL BUNDLE DESIGN FOR ENHANCED USAGE OF PLUTONIUM FUEL

[75] Inventors: Anthony P. Reese, San Jose; Russell E. Stachowski, Fremont, both of Calif.

[73] Assignee: General Electric Company, San Jose, Calif.

[21] Appl. No.: 184,168

[22] Filed: Jan. 21, 1994

[51] Int. Cl.⁶ ............................................. G21C 3/32
[52] U.S. Cl. ................................ 376/435; 376/419; 376/428
[58] Field of Search ............... 376/212, 419, 428, 435, 376/349, 267; 976/DIG. 64

[56] References Cited

U.S. PATENT DOCUMENTS

| | | | |
|---|---|---|---|
| 3,802,995 | 4/1974 | Fritz et al. | 376/435 |
| 4,652,427 | 3/1987 | Uchikawa et al. | 376/447 |
| 4,668,468 | 5/1987 | Santucci | 376/419 |
| 4,879,086 | 11/1989 | Luce et al. | 376/173 |
| 4,968,476 | 11/1990 | Radkowsky | 376/172 |
| 4,997,596 | 3/1991 | Proebstle et al. | 252/638 |
| 5,089,210 | 2/1992 | Reese et al. | 376/212 |
| 5,108,692 | 4/1992 | Schoenig et al. | 376/159 |
| 5,202,085 | 4/1993 | Aoyama et al. | 376/435 |

*Primary Examiner*—Donald P. Walsh
*Assistant Examiner*—Meena Chelliah
*Attorney, Agent, or Firm*—J. E. McGinness

[57] ABSTRACT

A nuclear fuel bundle includes a square array of fuel rods each having a concentration of enriched uranium and plutonium. Each rod of an interior array of the rods also has a concentration of gadolinium. The interior array of rods is surrounded by an exterior array of rods void of gadolinium. By this design, usage of plutonium in the nuclear reactor is enhanced.

21 Claims, 4 Drawing Sheets

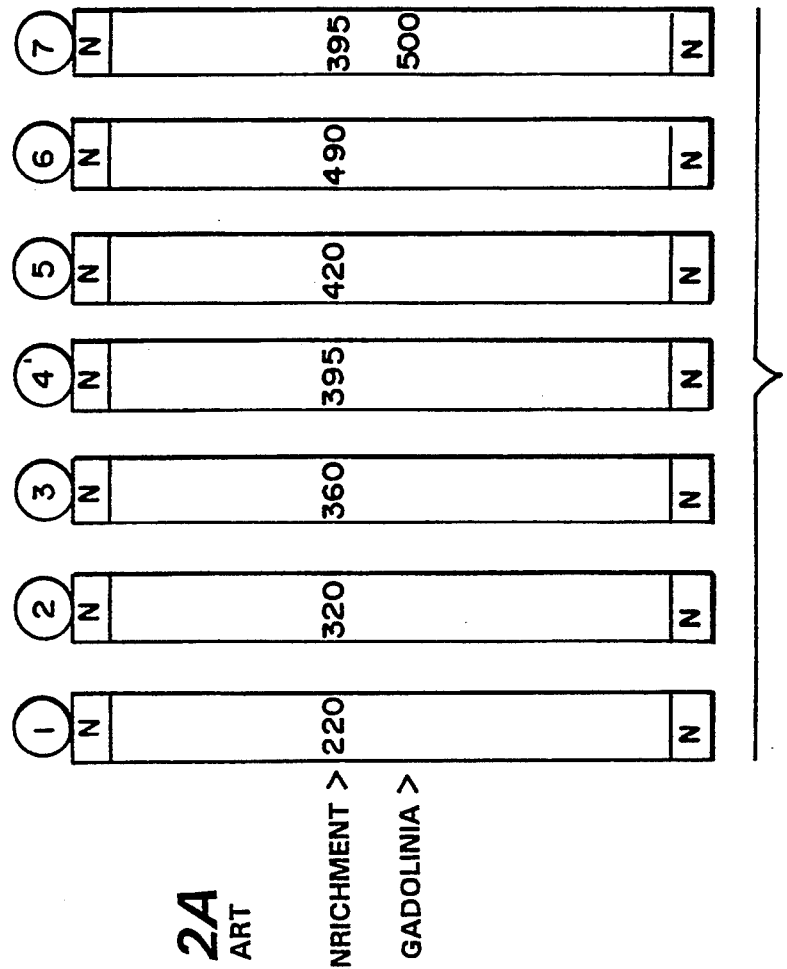
FIG. 2B PRIOR ART
FIG. 2A PRIOR ART
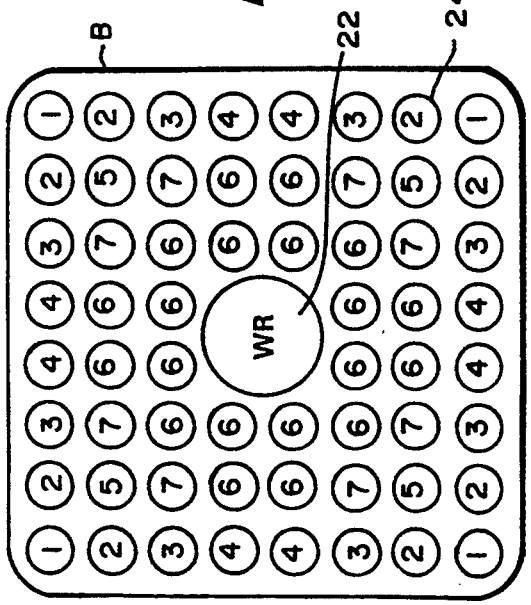
FIG. 2C PRIOR ART
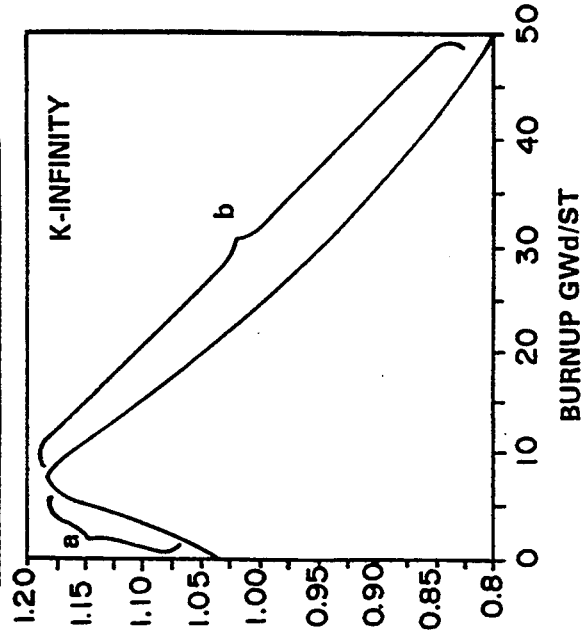

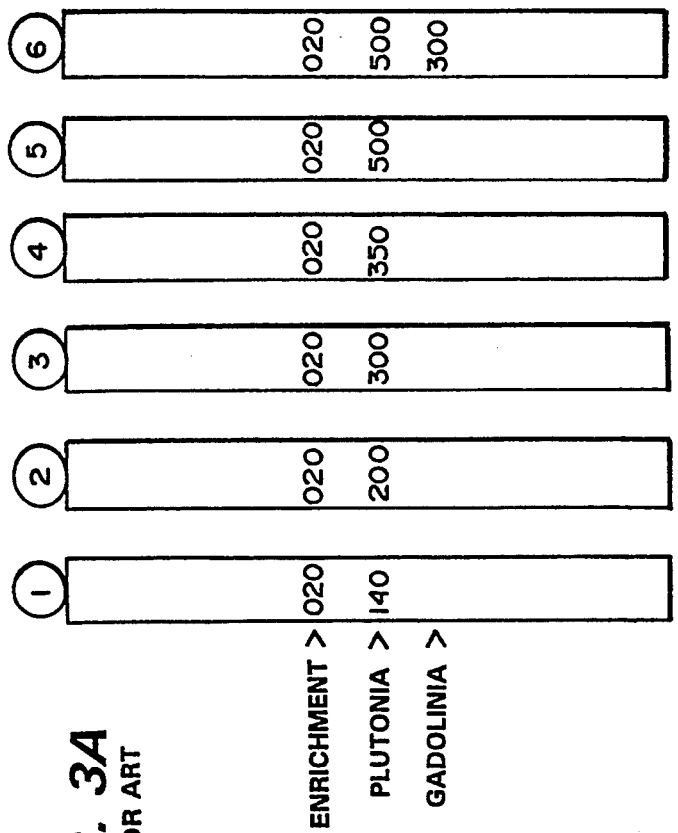
FIG. 3A PRIOR ART
FIG. 3B PRIOR ART
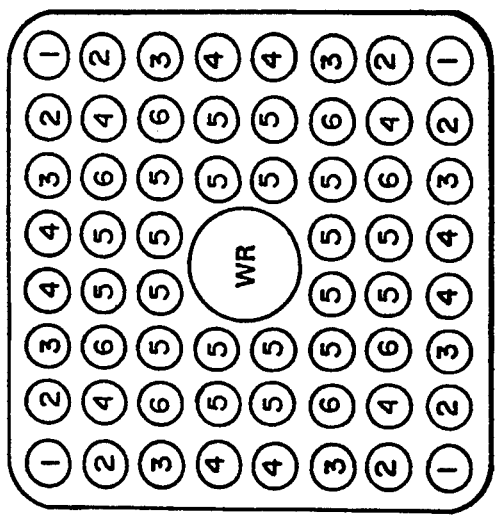
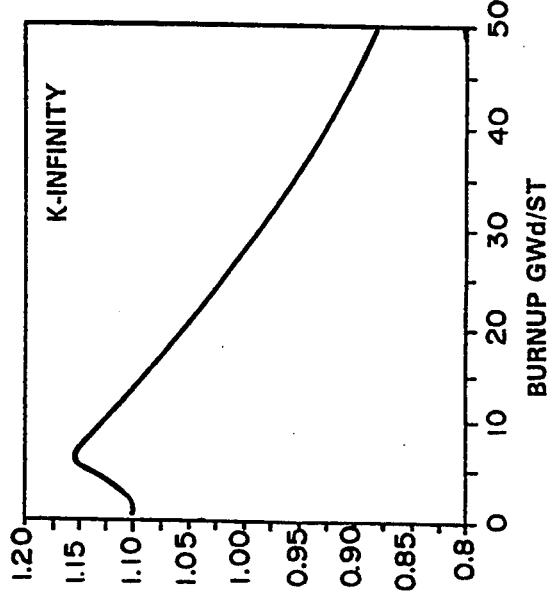
FIG. 3C PRIOR ART

FUEL BUNDLE DESIGN FOR ENHANCED USAGE OF PLUTONIUM FUEL

The United States Government has rights in this invention in accordance with DOE Contract No. DE-AC03-93SF19681 awarded by the Department of Energy.

TECHNICAL FIELD

The present invention relates to nuclear reactors and particularly to an arrangement and use of neutron absorbing materials such as gadolinia in the fuel rods of the bundle to enhance plutonium utilization in the reactor.

BACKGROUND

Increasingly, there is interest in the capabilities of nuclear reactors to transform and thereby destruct through reactor burnup large quantities of weapons grade plutonium. It is common, e.g. in boiling water reactors, to employ fissionable material, such as uranium and minor amounts of other fissionable materials, such as plutonium or thorium in the fuel pellets. Additionally, neutron absorbers are frequently used in the nuclear fuel pellets to control the inherent excess reactivity of the fuel in the core to achieve greater efficiency and economy and to prolong the service life of the fuel. For example, in boiling water reactors, uranium, which has initial excessive reactivity, is combined with a depletable neutron absorber, commonly referred to as a burnable poison, such as gadolinium. This initial excessive fuel reactivity is tempered by the introduction of the depletable neutron absorber which progressively expends its capacity to absorb neutrons. Thus, the burnable poison absorbs excess neutrons to level or stabilize the fuel reactivity rate during the period of initial excessive reactivity and then subsequently absorbs neutrons at a decreasing rate approximately commensurate with the diminishing reactivity of the fuel whereby a substantially constant rate of reactivity is maintained. In a typical boiling water reactor, the vast majority of the fuel rods of a fuel bundle comprise fissile uranium material with only a very few of the rods having a combination of the fissile uranium and a burnable poison, such as gadolinium.

While plutonium has previously been considered as an alternate fuel for boiling water reactors, as well as a combination of fissile uranium and plutonium with a burnable poison, for example, see U.S. Pat. No. 5,089,210 of common assignee herewith, it has been commonly believed that there is a severe limitation with respect to the quantity of plutonium which may be used in boiling water reactors. Particularly, it has previously been thought that no more than about one-quarter of the fuel rods in a reactor may be loaded with plutonium or mixed oxide fuel without unacceptable operational consequences. Also, reactor designers heretofore believed the presence of plutonium would interfere with the effectiveness of the gadolinium reactivity control. This is indeed the case when gadolinium is loaded into 10 to 20% of the rods, as is typical in reactors of this type. Hence, use of plutonium as a fuel in nuclear reactors has been inhibited by these and other considerations.

DISCLOSURE OF THE INVENTION

In accordance with the present invention, it has been found that a combination of urania, plutonia and gadolinia may be employed in the fuel rods in a manner to enhance utilization of plutonia, as a fuel for the nuclear reactor, provided the fuel rods are specifically arranged in each fuel bundle in conjunction with an extensive use of burnable poison in the fuel bundle. More particularly, it has been found that if the gadolinium is disposed in the interior fuel rods in combination with fissile uranium and plutonium and the exterior rods forming the perimeter of the fuel bundle are void of gadolinium, plutonium usage as a fuel in the reactor may be enhanced without destabilizing the power level of the reactor. The plutonium is preferably contained in all of the fuel rods of the bundle in various percentages.

As well known, the reactivity of a fuel bundle containing enriched uranium and gadolinium over time produces a characteristic reactivity curve, which each fuel bundle must approximate if overall steady-state power levels in the nuclear reactor are to be maintained. By combining the fissile materials of uranium and plutonium with gadolinium, the burnable poison, in a typical fuel bundle arrangement, a characteristically different reactivity curve than the desired curve is produced. It has been found, however, that by arranging the individual fuel rods containing the uranium, plutonium and burnable poison in an interior array of the rods and effecting more extensive use of the burnable poison, the characteristic reactivity curve of a typical enriched uranium fuel bundle with modest use of the burnable poison in largely separated fuel rods, may be approximated enabling steady-state power levels in the reactor. That is, the fuel bundle design containing the plutonium fuel desired to be transformed has reactivity characteristics which closely resemble the reactivity characteristics normally associated with enriched uranium fuel.

In a preferred embodiment according to the present invention, there is provided a nuclear fuel bundle comprising a plurality of fuel rods arranged in a generally square array, each of the rods having a predetermined concentration of fissile material with at least a majority of the rods including plutonium, a predetermined number of the rods having a concentration of a material for absorbing neutrons, the predetermined number of rods constituting an interior array thereof, all of which predetermined number of rods lie within a surrounding exterior array of fuel rods of the plurality thereof, the predetermined number of rods in the interior array thereof being in excess of 20% of the total number of the plurality of rods in said fuel bundle.

In a further preferred embodiment according to the present invention, there is provided a nuclear fuel bundle comprising a plurality of fuel rods arranged in the bundle, each of the rods having a predetermined concentration of fissile material with at least a majority of the rods including plutonium and a predetermined number of the rods having a concentration of material for absorbing neutrons. The fuel bundle also has a reactivity curve substantially corresponding to the reactivity curve illustrated in FIG. 4c.

In a still further preferred embodiment according to the present invention, there is provided in a nuclear reactor core having a plurality of fuel bundles, at least a first bundle of the plurality thereof containing a plurality of fuel rods having a concentration of enriched uranium with certain of the rods thereof having a concentration of a burnable poison, the first bundle having a reactivity curve substantially corresponding to the reactivity curve of FIG. 2c and at least a second bundle of the plurality thereof containing a plurality of fuel rods each having a concentration of enriched uranium and plutonium and certain of the rods of the second bundle forming an interior array thereof having a concentration of burnable poison surrounded by an exterior array of rods void of the burnable poison, the second bundle having a reactivity curve substantially corresponding to the reactivity curve of FIG. 4c.

Accordingly, it is a primary object of the present invention to provide, in a nuclear reactor, enhanced usage of plutonium as a reactor fuel.

BRIEF DESCRIPTION OF THE DRAWINGS

FIG. 2a is a schematic plan view of the lattice of the fuel rods in a fuel bundle according to the prior art;

FIG. 2b is an illustration identifying the constituents of the individual fuel rods illustrated in FIG. 2a;

FIG. 2c is a reactivity curve for the typical fuel bundle disclosed in FIG. 2a;

FIGS. 3a-3c are views similar to FIGS. 2a-2c, respectively, and illustrating a fuel bundle but with enriched uranium and plutonium as the fissile materials.

BEST MODE FOR CARRYING OUT THE INVENTION

Reference will now be made in detail to a present preferred embodiment of the invention, an example of which is illustrated in the accompanying drawings.

Figure 1:
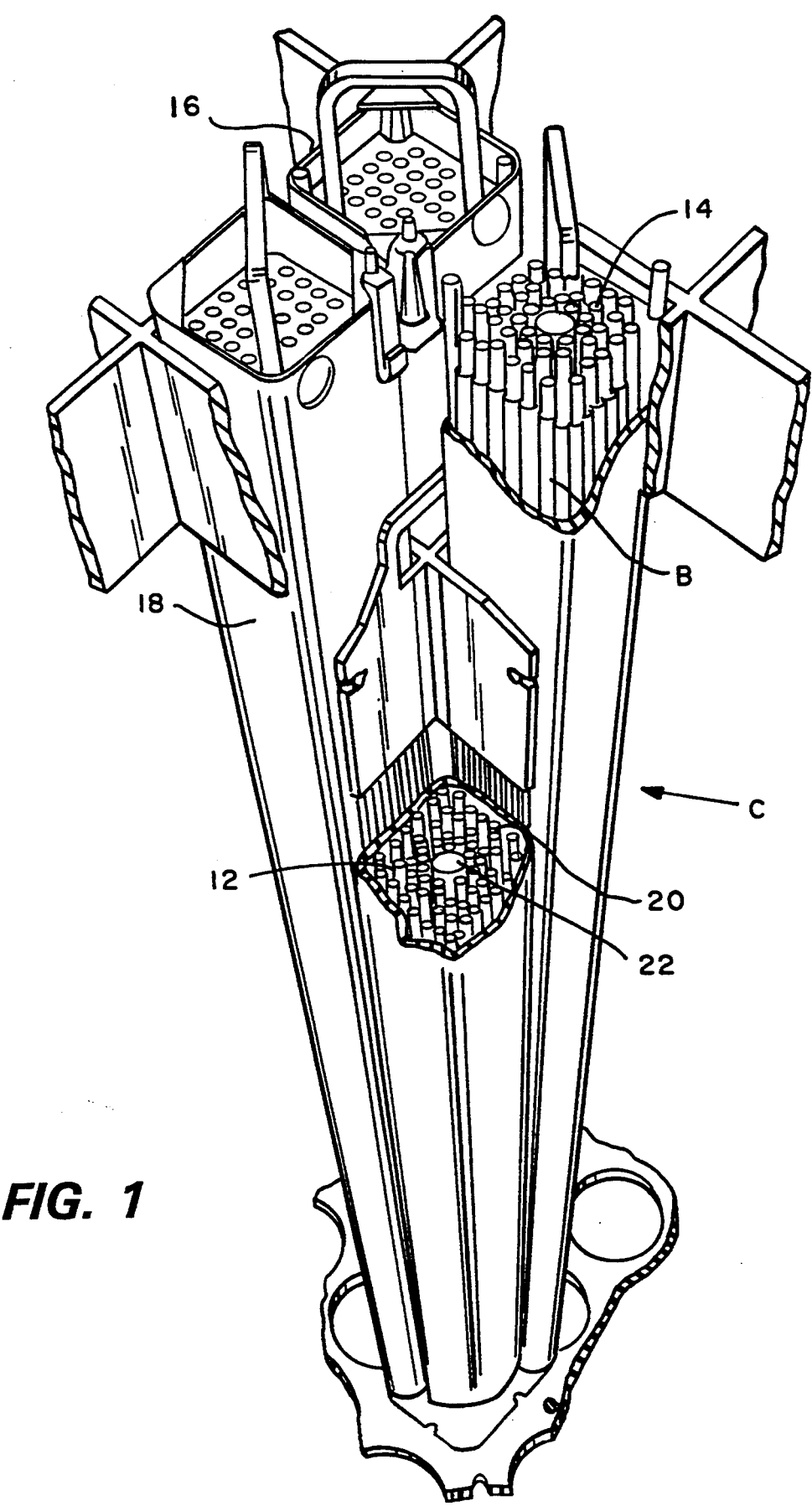
FIG. 1 is a perspective view of a group of four fuel bundles within a reactor core with portions of the supporting structure and bundles cut away to illustrate the fuel rods.

Referring now to FIG. 1, there is illustrated a core C of a typical boiling water nuclear reactor, including four side-by-side fuel bundles B disposed in a square array, the four bundles being illustrated at 12, 14, 16 and 18. The fuel bundles are supported in a manner well known to those skilled in this art and description of their support is not believed necessary. As illustrated, each fuel bundle includes a plurality of discrete fuel rods 20 containing nuclear fuel pellets and a water rod 22, whereby the reactor is supplied with fissionable material. Suffice to say that the self-sustaining fission reaction produces fission products, the kinetic energy of which is dissipated as heat in the fuel rods with the heat being removed by coolant water surrounding the rods and bundles boiling into steam from which useful work is extracted.

Referring to FIGS. 2a-2c of the prior art, FIG. 2 illustrates a typical fuel bundle design using enriched uranium as fuel. As illustrated in FIG. 2a, each fuel rod 24 in the lattice of rods is provided a number indicating its fuel loading. In FIG. 2b, the enriched uranium and burnable poison, e.g. gadolinium, loadings of each rod are illustrated. For example, the fuel rod denoted 3 in FIG. 2b indicates a fuel rod containing 3.6% enriched uranium, the balance of the rod being formed substantially of uranium. Also, all rods designated 3 in the bundle B of FIG. 2a have these constituents. The rod numbered 7, however, contains 3.95% enriched uranium and 5.00% burnable poison, e.g., gadolinium. As noted in FIG. 2a, the rods numbered 7 having the combined enriched uranium and gadolinium concentration are few in number and are arranged geometrically symmetrically within the interior of the fuel bundle. Thus, only eight of the fuel rods of the sixty rods illustrated in a typical fuel bundle are loaded with the burnable poison gadolinium.

In FIG. 2c, there is illustrated a typical burnup reactivity curve showing the reactivity ($K-\infty$) as a function of fuel exposure (burnup). Burnup is a measure of the energy produced by the fuel during its useful lifetime. Note that the fuel reactivity rises sharply from a value near 1 at the beginning of its life, to a value of about 1.15 at a predetermined time corresponding to about 8 GWd/MT on the part of the curve designated a. This initial reactivity then declines in a nearly linear fashion to the end of its useful lifetime as indicated on the part of the curve designated b. It is important to maintain this characteristic curve for each fuel bundle as it permits fresh fuel bundles with increasing reactivity to offset the declining reactivity of the older fuel bundles. The reactivity balance enables the reactor to operate for extended periods at a relatively stable steady rate.

In FIGS. 3a-3c, there is illustrated a fuel bundle incorporating plutonium as fuel. Similarly as in the preceding drawing figures, enriched uranium, plutonia and gadolinia concentrations are shown for each rod. For example, rod numbered 3 includes 0.2% enriched uranium and 3.00% plutonium as the fissile material, the balance of the rod comprising substantially uranium. Gadolinia is not provided the rods numbered 3 in the lattice of FIG. 3a. Rod numbered 6, as illustrated in FIG. 3b, contains 0.20% enriched uranium, 5.00% plutonium and 3.00% gadolinia. As illustrated in FIG. 3a, the gadolinium-loaded fuel rods numbered 6 are few in number and lie within the fuel rod lattice, eight such rods being shown lying symmetrically within the interior of the fuel rod bundle B. A characteristic reactivity curve for these fuel rods is illustrated in FIG. 3c. Note that the reactivity curve is considerably different in shape, including slope, than the reactivity curve for the enriched uranium fuel rods of FIG. 2a.

Figure 4A:
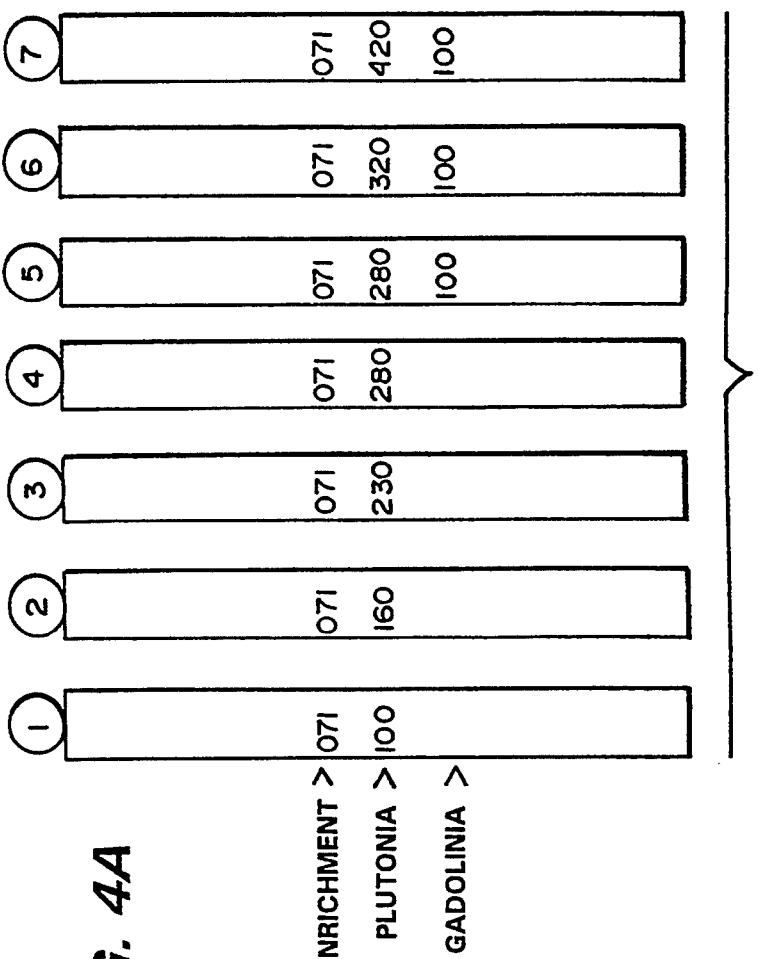
FIGS. 4a-4c are views similar to FIGS. 2a-2c, respectively, illustrating an arrangement of a lattice of fuel rods, their constituents and reactivity curve in accordance with a fuel bundle design of the present invention.
Figure 4B:
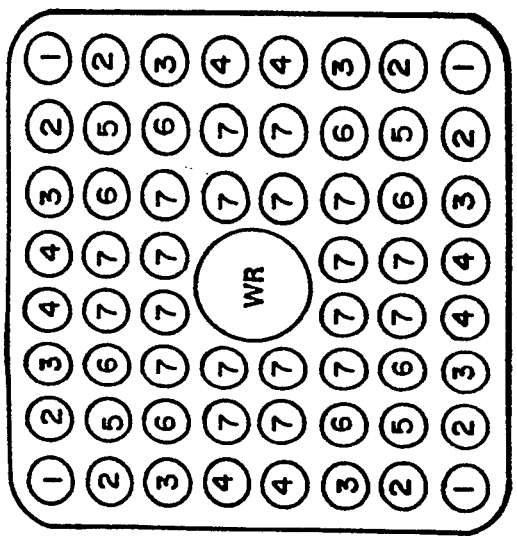
Figure 4C:
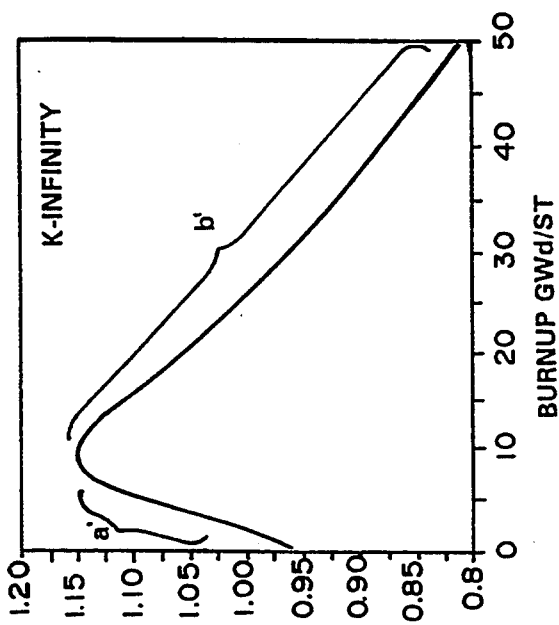

Turning now to FIGS. 4a-4c, illustrating a fuel bundle design according to the present invention, it will be appreciated that the same number of control rods in an 8×8 array as in the prior two fuel bundles is illustrated. FIG. 4b, as in the corresponding figures of the prior art, illustrates the constituents of the fuel rods. For example, fuel rods numbered 5, 6 and 7 have a gadolinia concentration of 1.00% in combination with various percentages of enriched uranium and plutonium. Rods numbered 1, 2, 3 and 4 are void of gadolinia. As illustrated in FIG. 4a, the gadolinia-loaded rods are arranged in an interior array and are wholly surrounded by an exterior array of fuel rods numbered 1, 2, 3 and 4 void of gadolinium.

In FIG. 4c, there is illustrated a burnup reactivity curve for the fuel bundle of FIG. 4a having the constituents identified in FIG. 4b. Note the rise in the fuel reactivity from startup to a peak indicated at a' and the nearly linear decline from the peak indicated at b'.

In accordance with the present invention, it has been found that the number of fuel rods containing the burnable poison, e.g. gadolinium, when combined with plutonium in an interior array of fuel rods, should be in excess of 20% of the total number of fuel rods in the fuel bundle in order to produce the characteristic reactivity curve illustrated in FIG. 4c. Note the substantial similarity in shape including slope between the reactivity curve of FIG. 4c and the reactivity curve of FIG. 2c, as well as the substantial dissimilarity between the reactivity curve of FIG. 4c and that of FIG. 3c. As indicated previously, it is important that the fuel bundle of the present invention, which results in enhanced use of plutonium as the fuel as in FIG. 4a, has a reactivity curve substantially corresponding in shape including slope to the reactivity curve of the bundles employing enriched uranium and gadolinium, as illustrated in FIGS. 2a-2c. These two reactivity curves of FIGS. 2c and 4c also substantially correspond in reactivity values. Thus, in FIG. 4a, each rod of the interior array of 32 fuel rods has a combination of enriched uranium, plutonia and gadolinia, hence enhancing plutonium usage, while the exterior array of 28 fuel rods is void of the burnable poison gadolinia and has a combination of only plutonium and enriched uranium. Lesser number of interior fuel rods containing the plutonium, enriched uranium and gadolinium can be used with the reactivity curve remaining substantially as illustrated. Consequently, the number of fuel rods containing the gadolinium lying in the interior array of fuel rods in the bundle should number in a range of 20% to 60% of the total number of rods in the fuel bundle. Also, each rod in the fuel rod bundle preferably has a percentage concentration of plutonium as one of its constituents and in excess of the percentage constituent of any other fissile materials in the rods. In this manner, the reactor fuel contains enhanced quantities of plutonium as compared with the quantities of plutonium previously thought possible as part of the fuel for reactors of this type.

By substituting a fuel bundle of the type illustrated in FIGS. 4a and 4b for a conventional fuel bundle of the type illustrated in FIGS. 2a and 2b in a nuclear reactor core, enhanced plutonium usage is obtained. This is made possible because of the substantial correspondence of the reactivity curves of these two different types of fuel bundles as illustrated by a comparison of FIGS. 2c and 4c. By substituting over time the bundles of FIGS. 4a and 4b for those of FIGS. 2a and 2c in the core, the nuclear reactor core may be operated and controlled similarly as if employing fuel bundles of the type illustrated in FIGS. 2a and 2b.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A nuclear fuel bundle comprising:
   a plurality of fuel rods arranged in a generally square array, each of said rods having a predetermined concentration of fissile material with at least a majority of said rods including plutonium;
   a predetermined number of said rods having a concentration of a material for absorbing neutrons, said predetermined number of rods constituting an interior array thereof, all of which predetermined number of rods be within a surrounding exterior array of fuel rods of said plurality thereof;
   said predetermined number of rods in said interior array thereof having said concentration of material for absorbing neutrons being in excess of 20% of the total number of said plurality of rods in said fuel bundle.

2. A nuclear fuel bundle according to claim 1 wherein said fissile material includes enriched uranium and plutonium and said neutron absorbing material comprises gadolinium.

3. A nuclear fuel bundle according to claim 1 wherein said exterior array of fuel rods is void of a burnable poison.

4. A nuclear fuel bundle according to claim 3 wherein said interior array of rods having said concentration of material for absorbing neutrons is arranged geometrically symmetrically about a central axis of the fuel bundle parallel to said rods.

5. A nuclear fuel bundle according to claim 4 wherein said interior array of rods having said concentration of material for absorbing neutrons constitutes all of the fuel rods within said bundle except said surrounding exterior array of said rods.

6. A nuclear fuel bundle according to claim 2 wherein said interior array of rods having gadolinium constitutes all of the fuel rods within said bundle except said surrounding exterior array of said rods.

7. A nuclear fuel bundle according to claim 1 wherein each of said rods includes a predetermined concentration of plutonium.

8. A nuclear fuel bundle according to claim 1 wherein each of said majority of said rods including plutonium has a percentage concentration of fissile plutonium in excess of a percentage concentration of any other fissile material in said rods.

9. A nuclear fuel bundle according to claim 1 wherein said fissile material includes enriched uranium and plutonium and said neutron absorbing material comprises gadolinium, said exterior array of fuel rods being void of a material for absorbing neutrons.

10. A nuclear fuel bundle according to claim 9 wherein said interior array of rods having gadolinium constitutes all of the fuel rods within said bundle except said surrounding exterior array of said rods, each of said rods including a predetermined concentration of plutonium.

11. A nuclear fuel bundle according to claim 10 wherein each of said majority of said rods including plutonium has a percentage concentration of fissile plutonium in excess of a percentage concentration of any other fissile material in said rods.

12. A nuclear fuel bundle according to claim 1 having a reactivity curve substantially corresponding to the reactivity curve illustrated in FIG. 4c of the drawings.

13. A nuclear fuel bundle according to claim 1 wherein said fissile material includes enriched uranium and plutonium and said neutron absorbing material comprises gadolinium, each of said interior array of rods having a percentage concentration of gadolinium, plutonium and enriched uranium.

14. A nuclear fuel bundle according to claim 13 wherein each of said rods includes a predetermined concentration of plutonium, said fuel bundle having a reactivity curve substantially corresponding to the reactivity curve illustrated in FIG. 4c of the drawings.

15. A nuclear fuel bundle comprising:
   a plurality of fuel rods arranged in said bundle, each of said rods having a predetermined concentration of fissile material with at least a majority of said rods including plutonium, a predetermined number of said rods having a concentration of a material for absorbing neutrons, said fuel bundle having a reactivity curve substantially corresponding to the reactivity curve illustrated in FIG. 4c of the drawings.

16. A nuclear fuel bundle according to claim 15 wherein said fissile material includes enriched uranium and plutonium and said neutron absorbing material comprises gadolinium.

17. A nuclear fuel bundle according to claim 15 wherein said rods are arranged in said fuel bundle in interior and exterior arrays thereof with said exterior array surrounding said interior array, only the rods of said interior array thereof having said neutron absorbing material, said exterior array of rods being void of said neutron absorbing material.

18. A nuclear fuel bundle according to claim 17 wherein said fissile material includes a concentration of enriched uranium and said neutron absorbing material comprises gadolinium.

19. A nuclear fuel bundle according to claim 18 wherein each of said rods in said fuel bundle includes at least concentrations of plutonium and enriched uranium.

20. In a nuclear reactor core having a plurality of fuel bundles, at least a first bundle of said plurality thereof containing a plurality of fuel rods having a concentration of enriched uranium with certain of said rods thereof having a concentration of a burnable poison, said first bundle having a reactivity curve substantially corresponding to a reactivity curve illustrated in FIG. 2c of the drawings and at least a second bundle of said plurality thereof containing a plurality of fuel rods each having a concentration of enriched uranium and plutonium and certain of said rods of said second bundle forming an interior array thereof having a concentration of burnable poison surrounded by an exterior array of rods void of the burnable poison, said second bundle having a reactivity curve substantially corresponding to the reactivity curve of FIG. 4c of the drawings, the reactivity curves of FIGS. 2c and 4c substantially corresponding to one another.

21. In a nuclear reactor core having a plurality of fuel bundles, at least a first bundle of said plurality thereof containing a plurality of fuel rods having a concentration of enriched uranium with certain of said rods thereof having a concentration of a burnable poison, said first bundle having a reactivity curve showing reactivity as a function of fuel exposure, at least a second bundle of said plurality thereof containing a plurality of fuel rods each having a concentration of enriched uranium and plutonium and certain of said rods of said second bundle forming an interior array thereof having a concentration of burnable poison surrounded by an exterior array of rods void of the burnable poison, said certain of said rods forming said interior array thereof being in excess of 20% of the total number of said plurality of rods in said second bundle, said second bundle having a reactivity curve showing full reactivity as a function of fuel exposure and substantially corresponding to the reactivity curve of said first bundle.

* * * * *